(12) United States Patent
Reynolds

(10) Patent No.: US 7,885,012 B2
(45) Date of Patent: Feb. 8, 2011

(54) SHEARING RADIATION BEAM FOR IMAGING PRINTING MEDIA

(75) Inventor: Meritt W. Reynolds, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 251 days.

(21) Appl. No.: 12/177,898

(22) Filed: Jul. 23, 2008

(65) Prior Publication Data

US 2010/0020376 A1     Jan. 28, 2010

(51) Int. Cl.
     *G02B 13/08*     (2006.01)
(52) U.S. Cl. ...................... 359/668; 359/618
(58) Field of Classification Search ................ 359/618, 359/668–671
See application file for complete search history.

(56) References Cited

U.S. PATENT DOCUMENTS

| | | | |
|---|---|---|---|
| 4,093,964 A * | 6/1978 | Aughton | ............... 358/302 |
| 5,517,359 A | 5/1996 | Gelbart | |
| 5,923,475 A | 7/1999 | Kurtz et al. | |
| 6,137,631 A | 10/2000 | Moulin | |
| 6,249,385 B1 | 6/2001 | Yamazaki et al. | |
| 6,421,178 B1 | 7/2002 | Lissotschenko et al. | |
| 6,471,372 B1 | 10/2002 | Lissotschenko et al. | |
| 6,504,650 B1 | 1/2003 | Alfrey | |
| 7,209,624 B2 | 4/2007 | Reynolds et al. | |
| 2002/0191301 A1 | 12/2002 | Tanaka | |
| 2003/0169505 A1 * | 9/2003 | Mendlovic et al. | .......... 359/629 |
| 2006/0126690 A1 | 6/2006 | Kido et al. | |
| 2006/0176912 A1 | 8/2006 | Anikitchev | |
| 2006/0209310 A1 | 9/2006 | Muenz et al. | |
| 2006/0291509 A1 | 12/2006 | Mitra et al. | |

* cited by examiner

*Primary Examiner*—Darryl J Collins
(74) *Attorney, Agent, or Firm*—Nelson Adrian Blish

(57) ABSTRACT

An illuminator (10) for producing a radiation spot (120) on a workpiece (110) comprises a laser light source (20) and a beam-shearing optical system (30). Fine structure (160) generated by an integrator (80) of laser light source (20) in integrated beams (90) as a result of path length differences among coherent light beams (70) from emitters (60) of lasers (40) is sheared by the inclusion of beam-shearing optical system (30) into illuminator (10). Beam-shearing optical system (30) allows illuminator (10) to produce a radiation spot (120) in which the fine structure (160) is spread so that scanning of radiation spot (120) does not produce the striations (140) in scanned patch (170) that are obtained with prior art illuminators.

8 Claims, 6 Drawing Sheets

SHEARING RADIATION BEAM FOR IMAGING PRINTING MEDIA

FIELD OF THE INVENTION

The present invention relates to a system and method for shearing a radiation beam. In particular, the present invention relates to a system and method to reduce fine structure in radiation beams used in imaging printing media.

BACKGROUND OF THE INVENTION

Diode lasers are used in many imaging applications as a convenient and low-cost radiation source. Material processing applications may make use of suitably coupled diode laser radiation to change the nature or character of a workpiece. Image recording and display systems may use laser diodes to provide illumination for an optical system.

In one particular imaging application, a monolithic array of laser diode emitters may be used to illuminate a multi-channel light valve. A light valve generally has a plurality of individually addressable modulator sites; each site producing a beam or channel of imagewise modulated light. An image is formed by selectively activating the channels while scanning them over an image receiver. For high quality imaging it is usually necessary that channels be uniform in their imaging characteristics, a requirement that presents a difficult challenge for system designers since the illumination from a laser diode is highly astigmatic with poor overall beam quality. Consequently optical systems for gathering and formatting the light output seek to overcome the inherent limitations of the diode laser output in order to produce useable illumination.

U.S. Pat. No. 5,517,359 (Gelbart) describes a method for imaging the radiation from a laser diode array having multiple emitters onto a linear light valve. The optical system superimposes the radiation line from each emitter at the plane of the light valve, thus forming a single combined illumination line. The superimposition provides some immunity from emitter failures (either partial of full). In the event of such a failure, while the output power is reduced, the uniformity of the line is not severely impacted.

Even with superimposed emitters, the uniformity of the individual emitter radiation profiles still has an impact on the overall uniformity of the line. A good laser diode array can have emitters that are more than 20% non-uniform in the slow axis. When the radiation from a plurality of emitters is combined, some of the non-uniformities may offset each other but commonly 10-15% non-uniformity remains. Some light valves can accommodate this non-uniformity by balancing the output from each channel by attenuating output from channels that are more strongly illuminated. This, however, represents wastage of up to 15% of the useful light output since it is not possible to amplify weak channels.

U.S. Pat. No. 6,137,631 (Moulin) describes a means for mixing the radiant energy from a plurality of emitters on a laser diode array. The mixing means comprises a plurality of reflecting surfaces placed at or downstream from a point where the laser radiation has been focused. The radiant energy entering the mixing means is subjected to multiple reflections, which makes the output distribution of the emerging radiant energy more uniform.

Laser diode arrays having nineteen or more 150 µm emitters are now available with total power output of around 50 W at near-infrared wavelengths. While efforts are constantly underway to provide higher power, material and fabrication techniques still limit the power that can be achieved for any given configuration. In order to provide illumination lines with total power in the region of 100 W, an optical system designer may only be left with the option of combining the radiation from a plurality of laser diode arrays. In so combining the radiation, care has to be taken to retain the brightness of the illumination. This imposes practical limitations on the designer.

U.S. Pat. No. 7,209,624 (Reynolds et al.) describes an illumination system in which the radiation from one or more laser arrays is directed into a light pipe. The light pipe mixes the individual radiation contributions from the laser arrays and forms a uniform illumination line. The pointing direction of each of the laser arrays is monitored and controlled to preserve the brightness of the composite illumination line.

U.S. Pat. No. 5,923,475 (Kurtz et al.) describes an illumination system for a laser printer comprised of a laser diode array, a cross array illumination optics, a laser lenslet array, a spatial light modulator, and a fly's eye integrator which illuminates the spatial light modulator with flooded uniform light. The design seeks to provide spatially and angularly homogenized uniform flood illumination of the spatial light modulator from a plurality of diode laser emitters.

The power emitted by individual diode lasers having risen as a result of technological development and it has become possible to employ ever fewer individual lasers or laser emitters to attain a given power level. While this is in general a good development, there is one aspect that complicates optical systems design. The problem is that the increased coherence-induced fine structure results when the radiation is combined for practical application, whether this is through the use of optical fiber structures, mirrors, fly eye structures or any other device that largely retains the coherence of the light. When such arrangements are employed in illuminators for imaging purposes, as in the preparation, for example, of a laser imaged lithographic plate, the fine structure may be imposed on the lithographic plate producing unwanted striations.

Thus, there exists a requirement for a means to reduce or remove the fine structure from such illumination systems.

SUMMARY OF THE INVENTION

Briefly, according to one aspect of the present invention an illuminator includes a laser light source and a beam-shearing optical system, wherein light from the laser light source is directed through the beam-shearing optical system. The illuminator has a laser light source which includes one or more emitters extending in a first direction. The laser light source is arranged to emit one or more light beams about an optical axis perpendicular to the first dimension. The anomorphic optical system has one or more planes of symmetry containing the optical axis. At least one light beam from the laser light source is directed through the beam-shearing optical system. A lest one of the planes of symmetry is oriented at an angle of between 0 and +/−90 degrees with respect to the first dimension.

The invention and its objects and advantages will become more apparent in the detailed description of the preferred embodiment presented below.

BRIEF DESCRIPTION OF THE DRAWINGS

The present invention will be more readily understood from the detailed description of exemplary embodiments presented below considered in conjunction with the attached drawing.

DETAILED DESCRIPTION OF THE INVENTION

Figure 1:
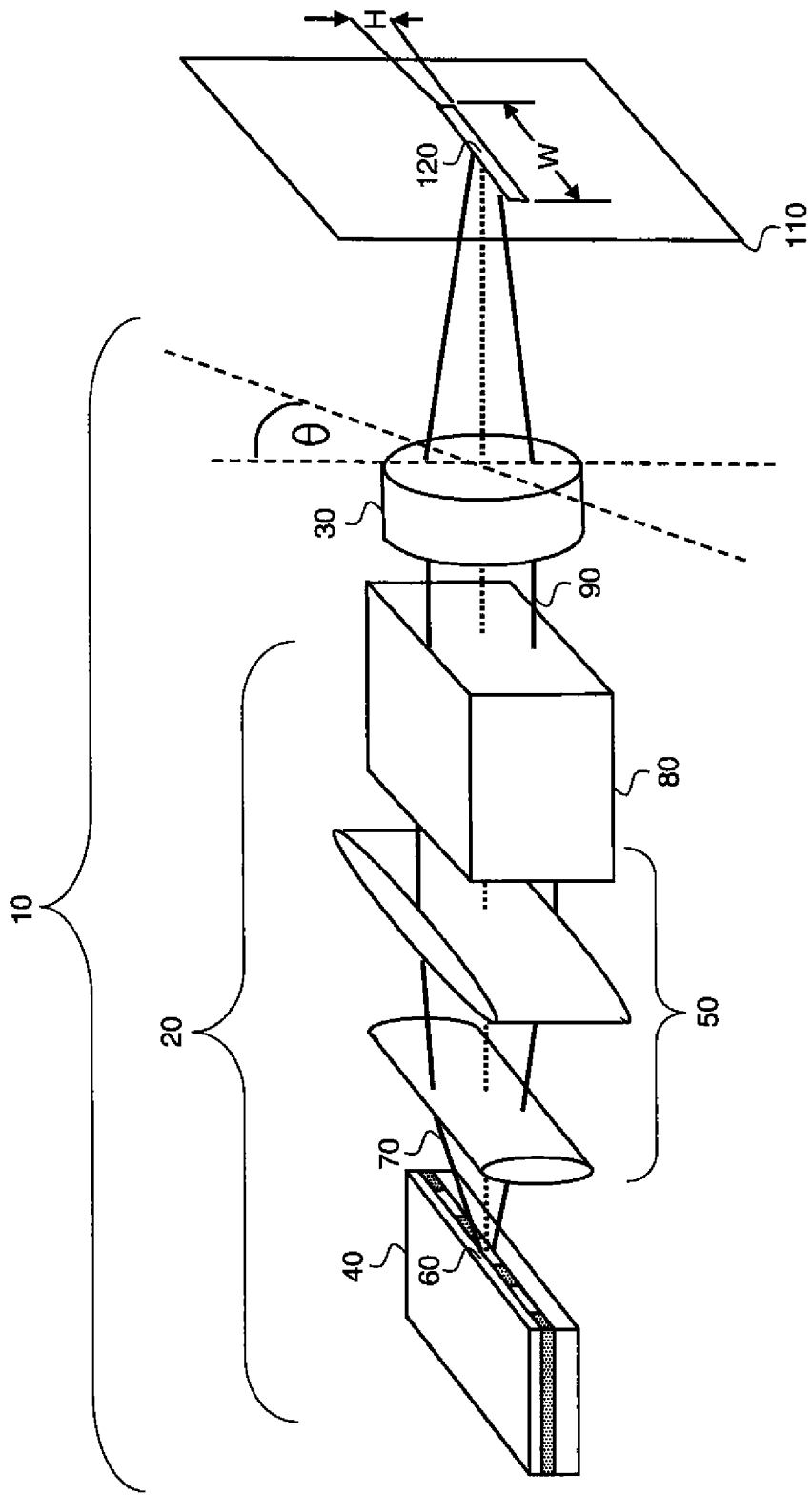
FIG. 1 shows an illuminator comprising a laser light source and a beam-shearing optical system.

In FIG. 1, showing a preferred embodiment of the present invention, an illuminator 10 comprises a laser light source 20 and a beam-shearing optical system 30. Laser light source 20 comprises one or more lasers 40, collector system 50, and integrator 80. Each laser 40 comprises one or more emitter 60. Light beams 70 from emitters 60 are collected into integrator 80 by collector system 50 to produce integrated beam 90.

Collector system 50 can be any optical element capable of suitably collecting the light from emitter 60. An example is provided by U.S. Pat. No. 5,517,359. Integrator 80 can be any suitable integrator, including but not limited to a light pipe as in U.S. Pat. No. 6,137,631 or U.S. Pat. No. 7,209,624, or a fly's eye integrator as described in U.S. Pat. No. 5,923,475, or the like.

The light beams 70 from emitter 60 are collected by collector system 50 and integrated by integrator 80 to produce integrated beam 90. Due to the coherent nature of the light from emitter 60, the combined light beams 70 from emitter 60 traverse different path lengths and are therefore out of phase at the exit of laser light source 20, thereby creating fine structure in integrated beam 90. The more singular the modal structure of emitter 60, the deeper the modulation producing the fine structure.

Beam-shearing optical system 30 spreads the fine structure across the beam, thereby reducing any striations that may be created by the unsheared integrated beam 90 produced by laser light source 20. In a preferred embodiment, light beams 70 are coupled into collector system 50 such that integrated beam 90, if focused onto a workpiece 110, produces a radiation spot 120 with a very large aspect ratio in which the dimension W of radiation spot 120 in the plane of lasers 40 is much larger than the dimension H of radiation spot 120 that is perpendicular to the plane of lasers 40.

Figure 2:
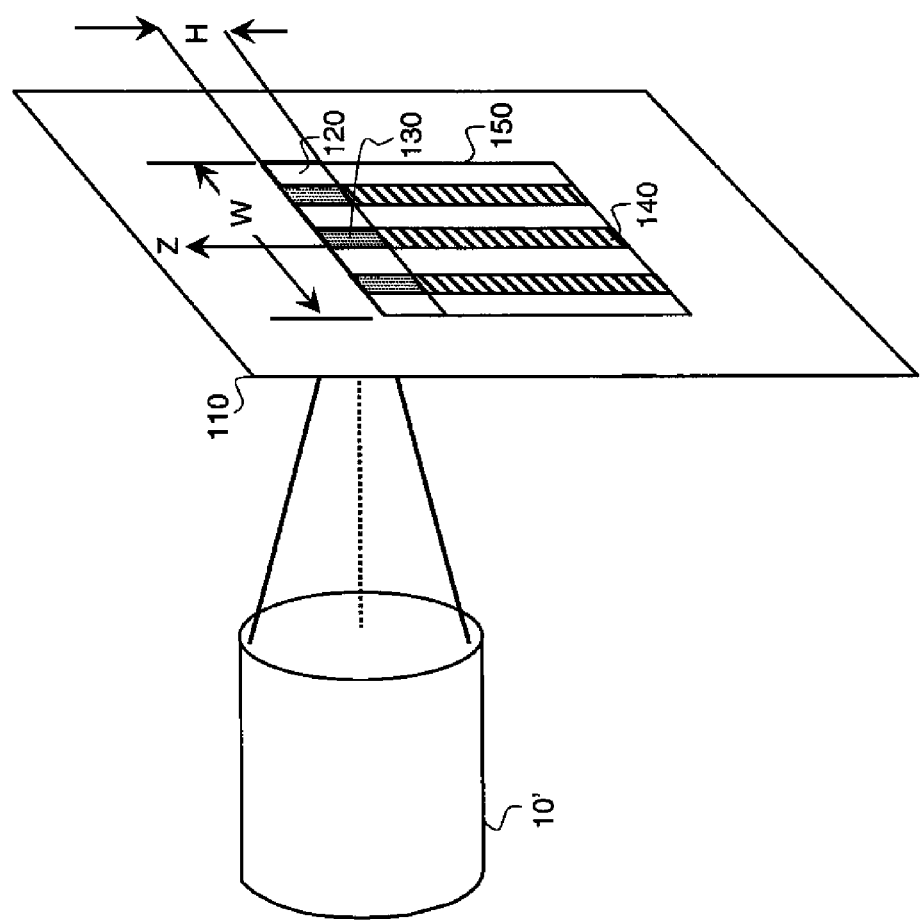
FIG. 2 shows a scanned patch made with an illuminator of the prior art.

Turning to FIG. 2, representing the prior art, no beam-shearing optical system 30 is incorporated in illuminator 10', and radiation spot 120 has fine structure 130. When radiation spot 120 produced in this way is scanned in direction Z, it produces striations 140 in scanned patch 150.

Figure 3:
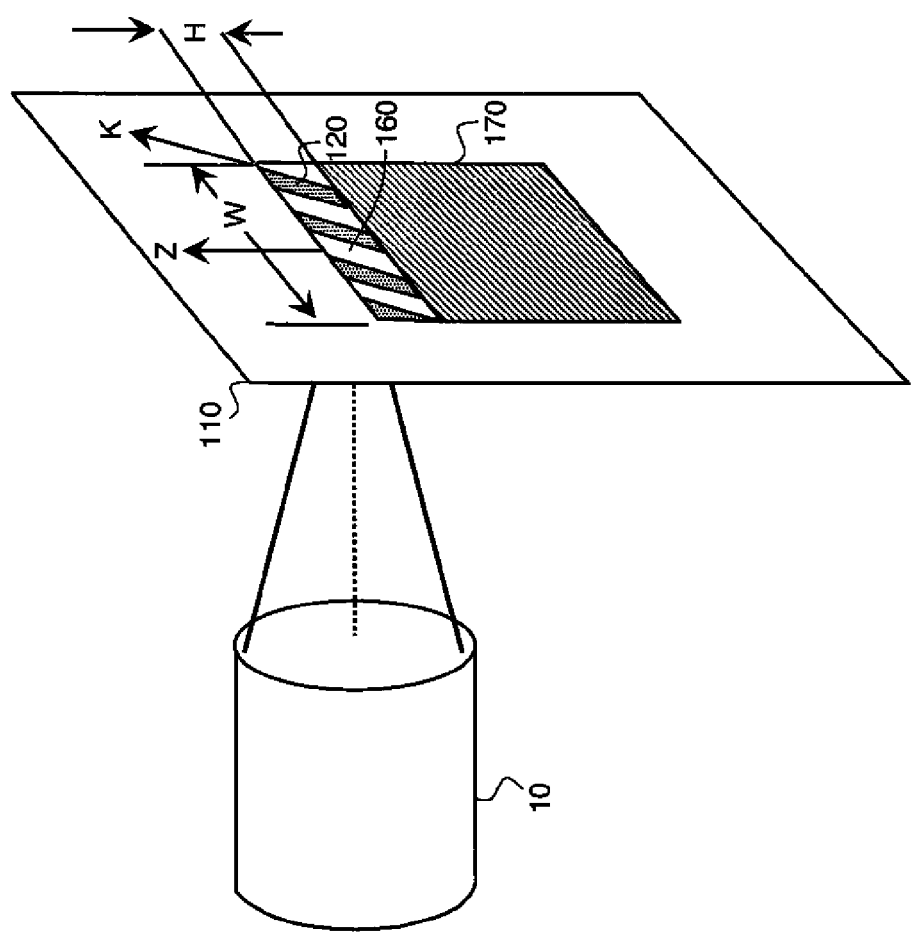
FIG. 3 shows a scanned patch made with an illuminator of the present invention.

FIG. 3 shows an embodiment of the present invention, wherein beam-shearing optical system 30 is incorporated in illuminator 10, such that radiation spot 120 has sheared fine structure 160. When radiation spot 120 produced in this way is scanned in direction Z, it produces scanned patch 170 with much reduced or no striations.

In a preferred embodiment of the present invention, shown in FIG. 1, beam-shearing optical system 30 is an anomorphic optical system, including but not limited to an anomorphic optical system comprising at least one reflective and one refractive element. Emitter 60 extends in a first dimension and is arranged to emit one or more light beams about an optical axis perpendicular to the first dimension. At least one light beam from emitter 60 is directed through beam-shearing optical system 30, beam-shearing optical system 30 having one or more planes of symmetry containing the optical axis and at least one of the planes of symmetry is oriented at an angle of between 0 and +/−90 degrees with respect to the first dimension.

Figure 4:
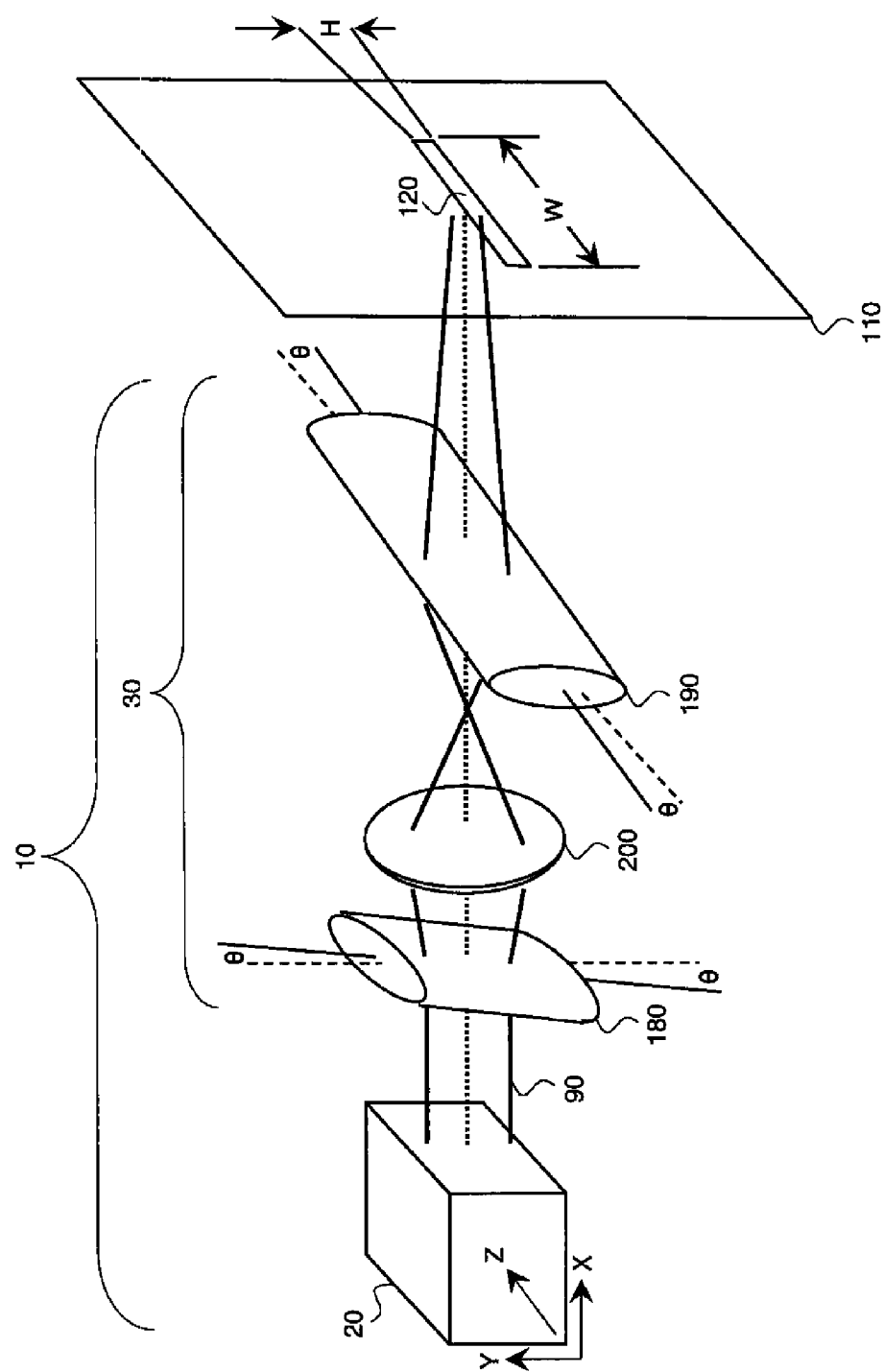
FIG. 4 shows an illuminator comprising a beam-shearing optical system, the beam-shearing optical system comprising an anomorphic optical system based on a pair of crossed cylindrical lenses and a spherical lens.

In a preferred embodiment of the present invention, shown in FIG. 4, beam-shearing optical system 30 is anomorphic and comprises a pair of crossed cylindrical lenses 180 and 190, together with a spherical lens 200, positioned on the optical axis of illuminator 10. Beam-shearing optical system 30 is rotated at a small angle θ different from 0 degrees with respect to the fine structure in integrated beam 90 emitted by laser light source 20. In this embodiment of the present invention, the degree of shear is determined by the magnitude of the angle θ. For θ=0 there is no shear.

Figure 5:
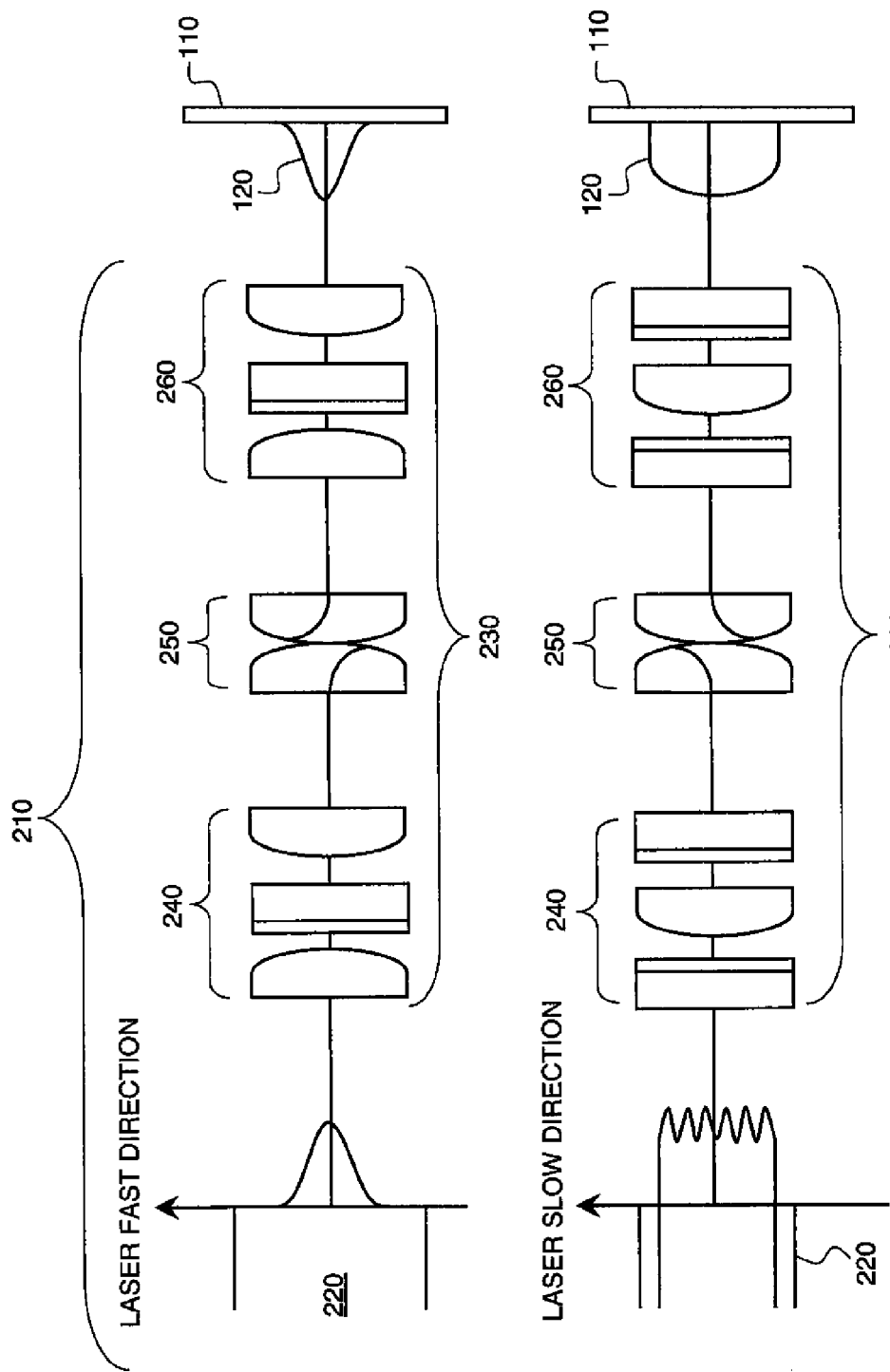
FIG. 5 shows an illuminator comprising a beam-shearing optical system based on optical Fourier transformation.

In an embodiment of the present invention shown in FIG. 5, an illuminator 210 comprises a laser light source 220 and beam-shearing optical system 230. Beam-shearing optical system 230 is an optical image processing system based on an optical Fourier transformation. Beam-shearing optical system 230 comprises Fourier transformer 240, filter 250, and a reverse Fourier transformer 260. Fourier transformer 240 performs a Fourier transform in the y-direction and is a unit magnifier in the x-direction, x and y being mutually perpendicular and both perpendicular to the optical axis of illuminator 210. Reverse Fourier transformer 260 performs a reverse Fourier transform in the y-direction and is a unit magnifier in the x-direction.

Filter 250 comprises two crossed cylindrical lenses with their axes at 45 degrees with respect to the x and y axes, and the x and y axes are both perpendicular to the optical axis of illuminator 210. In incorporating beam-shearing system 230 into illuminator 210, the x axis of beam-shearing optical system 230 is aligned parallel to the fine structure in the light emitted by laser light source 220. In this embodiment, the degree of shear is determined by the optical power of the crossed cylindrical lenses of filter 250. As with the embodiment of FIG. 4, the light emitted by illuminator 210, can be focused onto a workpiece 110, to produce a radiation spot 120 with a very large aspect ratio in which the dimension W of radiation spot 120 in the plane of lasers (that is, the slow direction of the laser) is very much larger than the dimension H of radiation spot 120 that is perpendicular to the slow direction of the lasers.

Figure 6:
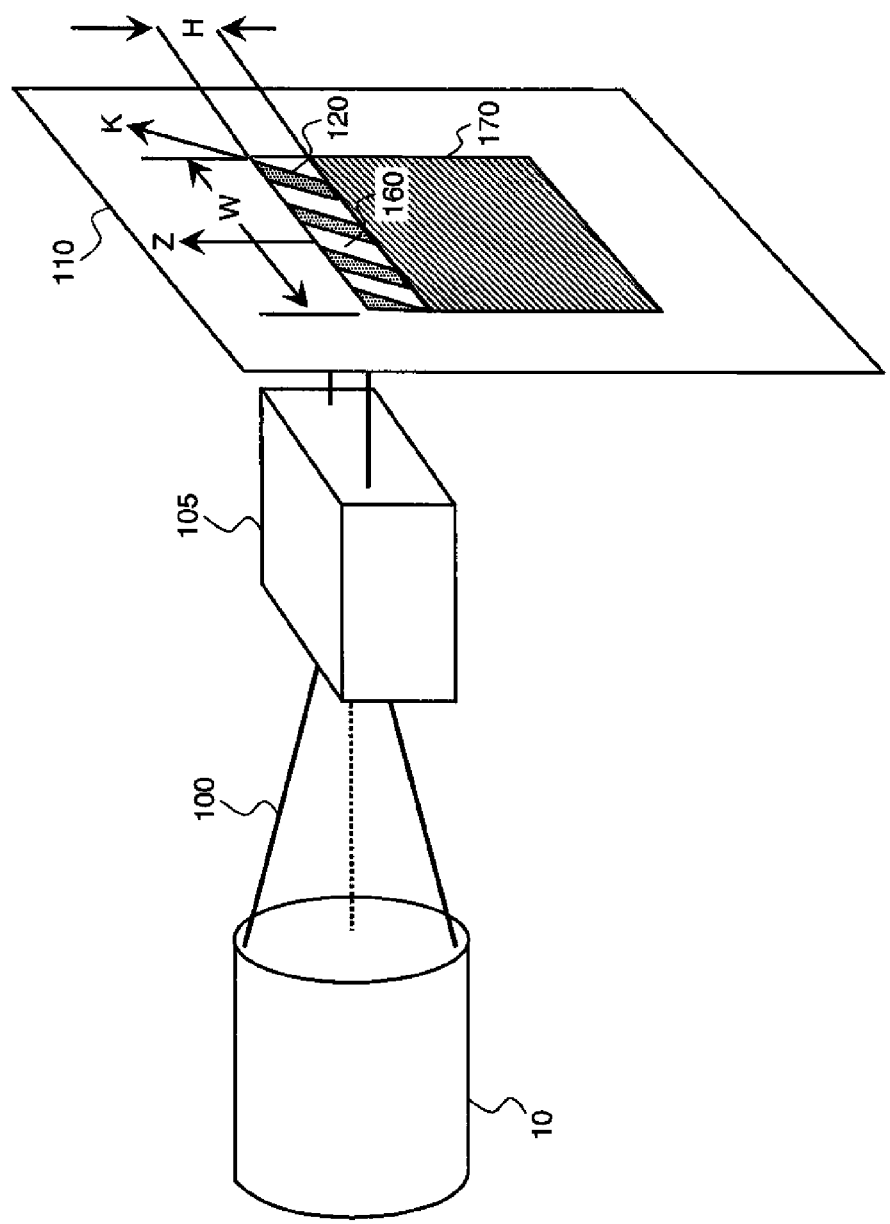
FIG. 6 shows a scanned patch made with an illuminator of the present invention with its resultant sheared light beams directed through a spatial light modulator.

FIG. 6 shows that sheared light beam 100, directed first to a spatial light modulator 105, which imagewise modulates integrated beam 90, and can then made to impinge on workpiece 110 through suitable focusing optics (not shown). Workpiece 110 may be a media to be imaged, including but not limited to a printing plate, which printing plate can be, but is not limited to, a lithographic printing plate or a flexographic printing plate. The media to be imaged can also be a gravure cylinder. Without the beam-shearing optical system of the present invention in the illuminator, the fine structure of integrated beam 90 would be imposed on the media.

Returning to FIG. 3, the method of the present invention comprises, irradiating a scanned patch 170 on a workpiece 110. The irradiating comprises scanning a radiation spot 120 having a fine structure 160 having linear extent in a first direction K, scanning in a second direction Z, the second direction Z having a component perpendicular to the first direction K in the plane of workpiece 110 at the radiation spot 120. In a preferred embodiment of the present invention, fine structure 160 comprises lines oriented in the first direction K.

Fine structure 160 is produced by distorting the integrated light beams 90 from a laser light source 20 to form radiation spot 120. In a preferred embodiment the distorting is shearing. In a preferred embodiment of the present invention, the shearing of integrated beams 90 comprises anamorphically distorting integrated beams 90. In a further preferred embodiment of the present invention, shearing of integrated beams 90 comprises Fourier transforming integrated beams 90. More specifically, the shearing of integrated beams 90 can comprise anamorphically magnifying an intensity distribution in integrated beams 90 at one of a real and a virtual plane, or optically processing an intensity distribution in integrated beams 90 at a real or virtual plane by means of Fourier transformation According to one aspect, the invention comprises irradiating a patch on a work piece with an illumination spot having fine structure, forming the illumination spot using light beams from a light source, shearing the light beams used to form the illumination spot, and scanning the spot along a first direction in the plane of the workpiece, the first direction being at an angle of between 0 and 90 degrees with respect to any sheared fine structure in the illumination spot. The sheared light beams can be directed through a spatial light modulator to impinge on the work piece to imagewise modulate the illumination spot.

The important features of the invention have been outlined in order that the present contribution of the present invention to the art may be better appreciated. Those skilled in the art will appreciate that the conception on which this disclosure is based may readily be utilized as a basis for the design of other apparatus and methods for carrying out the several purposes of the invention. It is most important, therefore, that this disclosure be regarded as including such equivalent apparatus and methods as do not depart from the scope of the invention.

PARTS LIST 10 illuminator
10' illuminator
20 laser light source
30 beam-shearing optical system
40 laser(s)
50 collector system
60 emitter(s)
70 light beam
80 integrator
90 integrated beam
100 sheared light beam
105 spatial light modulator
110 workpiece
120 radiation spot
130 fine structure
140 striations
150 scanned patch
160 fine structure
170 scanned patch
180 cylindrical lens
190 cylindrical lens
200 spherical lens
210 illuminator
220 laser light source
230 beam-shearing optical system
240 Fourier transformer
250 filter
260 reverse Fourier transformer

The invention claimed is:

1. An illuminator comprising a laser light source and a beam-shearing optical system, wherein light from the laser light source is directed through the beam-shearing optical system:
   wherein the beam-shearing optical system is an anamorphic optical system:
   wherein:
   a) the laser light source comprises one or more emitters extending in a first dimension;
   b) the laser light source is arranged to emit one or more light beams about an optical axis perpendicular to the first dimension;
   c) the anamorphic optical system has one or more planes of symmetry containing the optical axis;
   d) at least one light beam from the laser light source is directed through the beam-shearing optical system; and
   e) at least one of the planes of symmetry is oriented at an angle of between 0 and +/−90 degrees with respect to the first dimension.

2. The illuminator of claim 1, wherein the anamorphic system comprises at least one of reflective and refractive elements.

3. The illuminator of claim 2, wherein the anamorphic system comprises crossed cylindrical lenses.

4. A method of irradiating a patch on a work piece with an illumination spot having fine structure, the method comprising:
   a) forming the illumination spot using light beams from a light source;
   b) shearing the light beams used to form the illumination spot;
   c) scanning the spot along a first direction in the plane of the workpiece, the first direction being at an angle of between 0 and 90 degrees with respect to any sheared fine structure in the illumination spot;
   wherein the shearing comprises at least one of:
   d) anamorphically magnifying an intensity distribution in the light beams at one of a real and a virtual plane; and
   e) optically processing an intensity distribution in the light beams at a real or virtual plane by means of Fourier transformation.

5. The method of claim 4, comprising directing the sheared light beams onto the work piece through a spatial light modulator and imagewise modulating the illumination spot.

6. The method of claim 5, wherein the work piece is a printing plate.

7. The method of claim 4, wherein the work piece is a media to be imaged.

8. A method of shearing a light beam comprising:
   a) generating the beam of light from a light source, the light source extending in a first dimension and arranged to emit the light beam about an optical axis perpendicular to the first dimension; and
   b) directing the light beam through one or more anamorphic optical elements each having one or more axes of symmetry, wherein the one or more axes of symmetry are positioned in a plane perpendicular to the optical axis at an angle of between 0 and +/−90 degrees with respect to the first dimension.

* * * * *